INVENTOR.
HAROLD A. NORBY
BY Beehler & Arant
ATTORNEYS

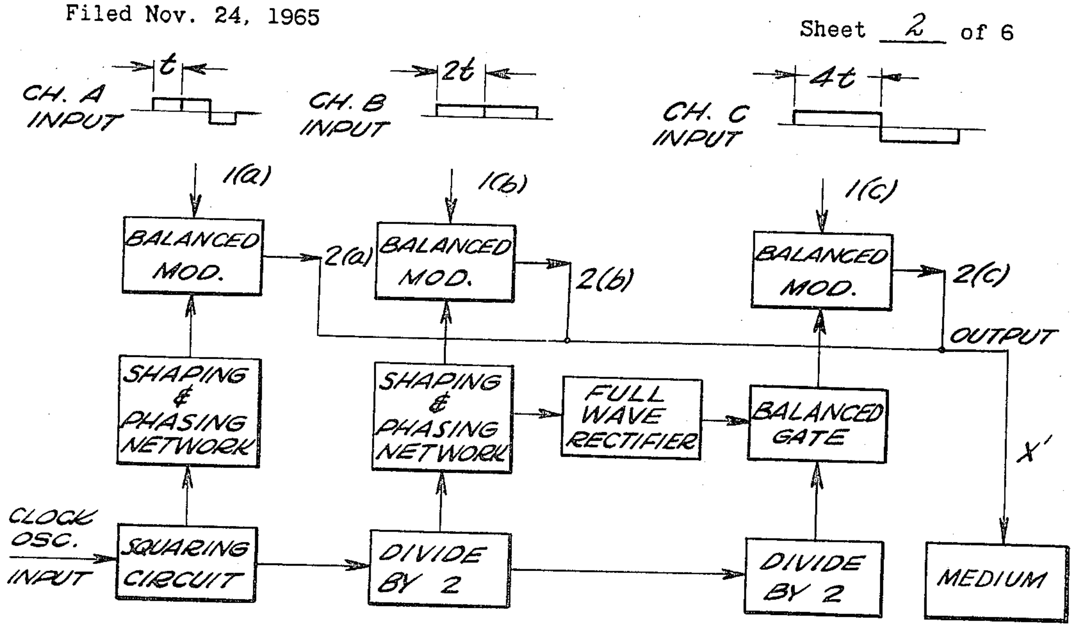
FIG. 6. WAVEFORM GENERATOR
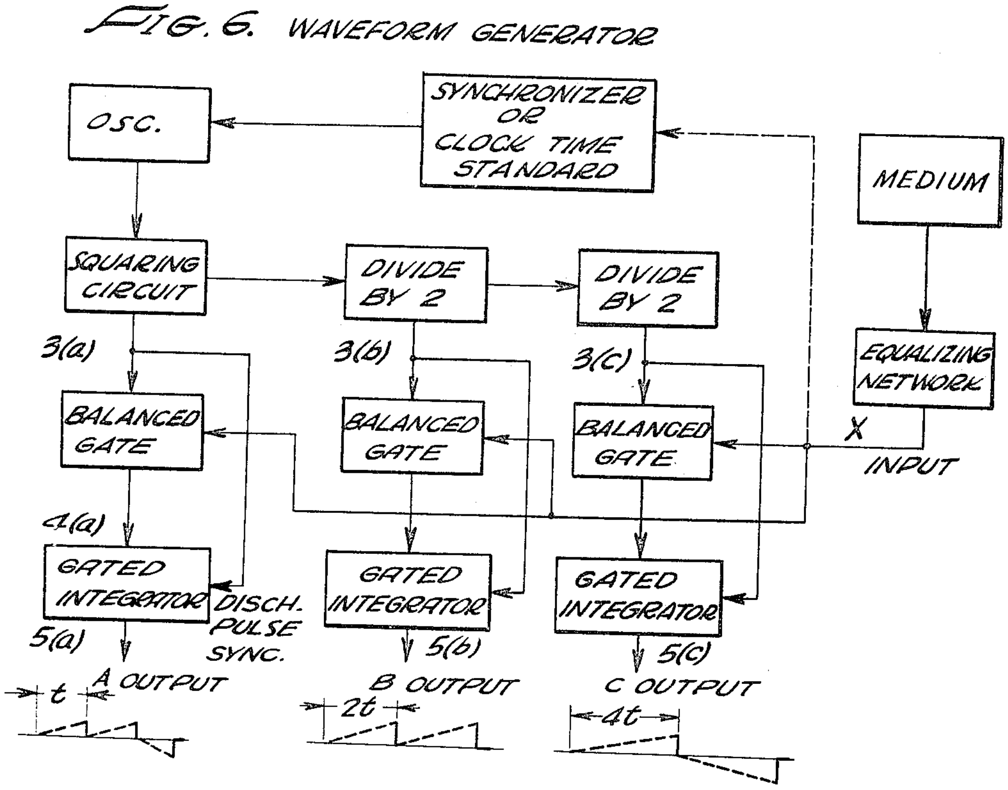
FIG. 7. WAVEFORM DEMODULATOR
INVENTOR.
HAROLD A. NORBY
BY Beehler & Arant
ATTORNEYS

METHOD OF MULTIPLEX REPRESENTATION OF SAMPLED DATA

Filed Nov. 24, 1965

INVENTOR
HAROLD A. NORBY
BY Beuhler & Arant
ATTORNEYS

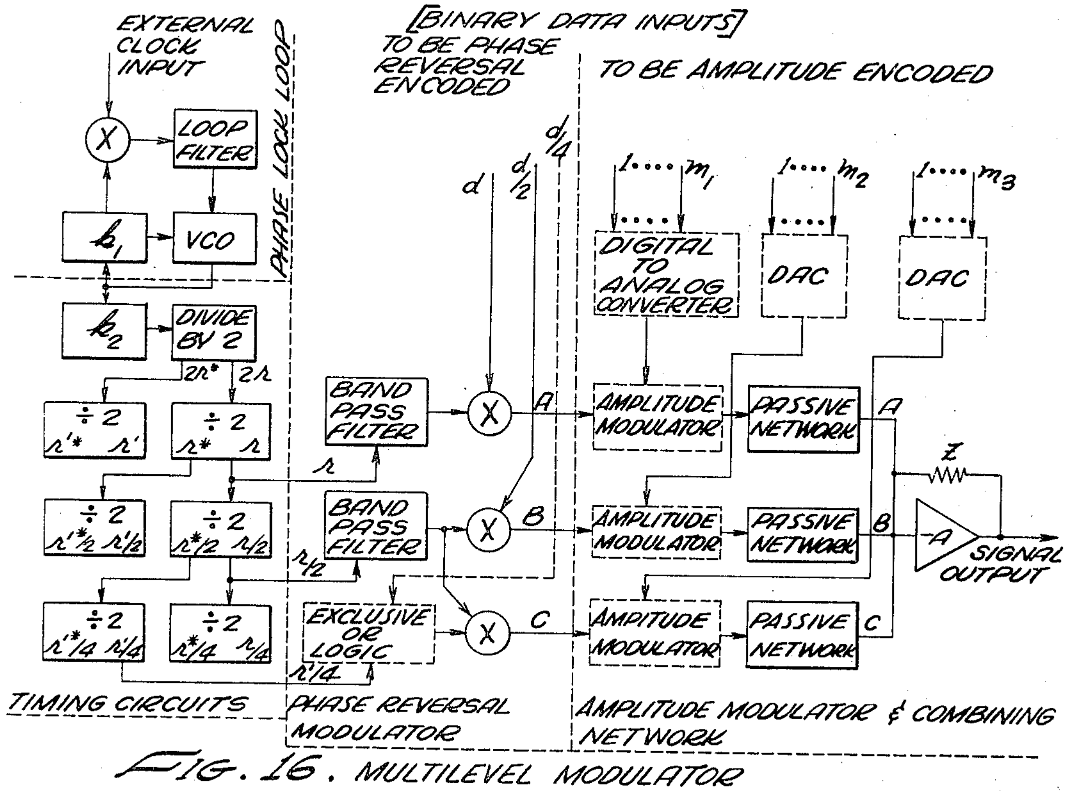
FIG. 16. MULTILEVEL MODULATOR
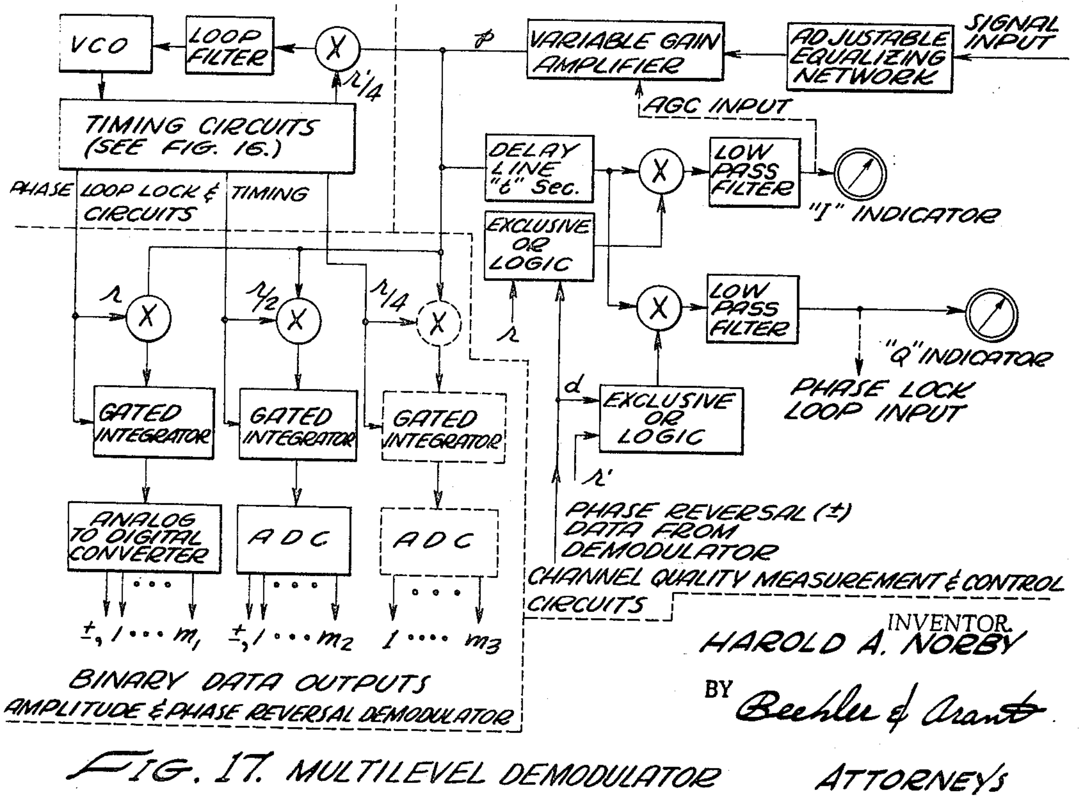
INVENTOR.
HAROLD A. NORBY
BY Beehler & Arant
ATTORNEYS
FIG. 17. MULTILEVEL DEMODULATOR

METHOD OF MULTIPLEX REPRESENTATION OF SAMPLED DATA

Filed Nov. 24, 1965 Sheet 5 of 6

COMMUTATOR/DECOMMUTATOR

INVENTOR.
HAROLD A. NORBY
BY Buehler & Arant
ATTORNEYS

INVENTOR.
HAROLD A. NORBY
BY
Beehler & Arant
ATTORNEYS

United States Patent Office 3,440,346

Patented Apr. 22, 1969

3,440,346

METHOD OF MULTIPLEX REPRESENTATION OF SAMPLED DATA

Harold A. Norby, 19031 Citronia St., Northridge, Calif. 91324

Continuation-in-part of application Ser. No. 48,230, Aug. 8, 1960. This application Nov. 24, 1965, Ser. No. 509,595

Int. Cl. H04l 27/24

U.S. Cl. 178—67 29 Claims

ABSTRACT OF THE DISCLOSURE

Arrangement for increasing the capacity of a communication medium by multiplexing pulse data in two or more signal series with different but synchronized pulse repetition rates.

The present invention relates to a method of multiplex representation of sampled data, which is particularly applicable where the data are to be transmitted through or recorded upon a medium of restricted band width, not including zero frequency.

The present application is a continuation-in-part of my prior copending application Ser. No. 48,230 filed Aug. 8, 1960, now abandoned.

In numerous applications a single information channel is utilized for carrying successive data samples represented by corresponding discrete waves or pulses, generally of equal time duration. Another method which has also been used involves the concurrent application of two similarly coded pulse series to an electrical medium, with each pulse series being displaced relative to the other by a predetermined portion of a pulse period. Both of these methods fail to utilize the full capacity of the electrical medium, however. The latter method is also subject to cross talk or interference between the two signal series.

The primary object of the present invention is to provide a method of multiplex representation of sampled data, whereby the full theoretical capacity of a transmission or recording medium is utilized, and at the same time cross talk between the different signal series is substantially eliminated.

Another object of the invention is to provide a method of multiplex representation of sampled data in which the repetition frequencies of three or more pulse series concurrently applied to a common medium bear a geometric relationship to each other.

According to the invention time multiplexing and frequency multiplexing are utilized simultaneously. The sampled data are represented in two or more signal series whose pulse repetition rates different from each other, and which are also in a time-synchronized relationship.

One essential of the invention is that each sampled data series, transmitted or recorded in a respective information channel, is represented by a corresponding series of doublet pulses. Furthermore, the doublet pulses in each series include some that are of reversed polarity.

A further essential of the invention is that the composite or multiplexed signal is demodulated or de-multiplexed by a coherent or synchronous process; and this demodulation of the composite signal is accomplished for each information channel independently of the others.

A primary advantage of the present invention is that the full utilization of the theoretical capacity of the transmitting or recording medium is closely approached, but without creating excessive cross talk between the various information channels.

The objects and advantages of the invention will be more fully appreciated from the following description considered in conjunction with the accompanying drawings, in which.

Figure 1A:
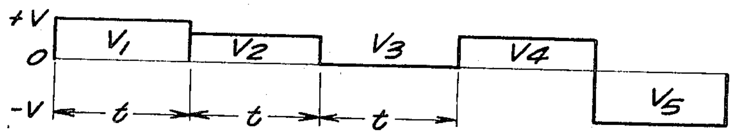
FIGURE 1(*a*) represents a time series of data samples.
Figure 2:
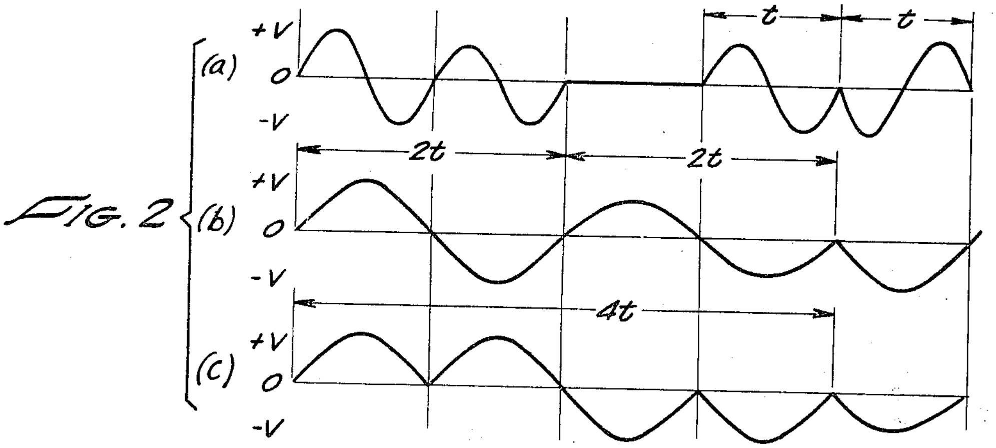
FIGURE 2(*a*) shows a signal series utilized in accordance with the invention for representing the data of FIGURE 1(*a*)
Figure 3A:
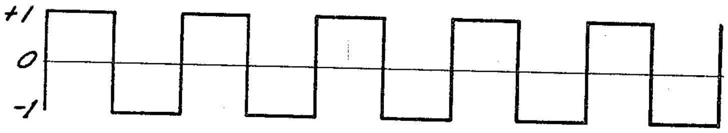
Figure 4:
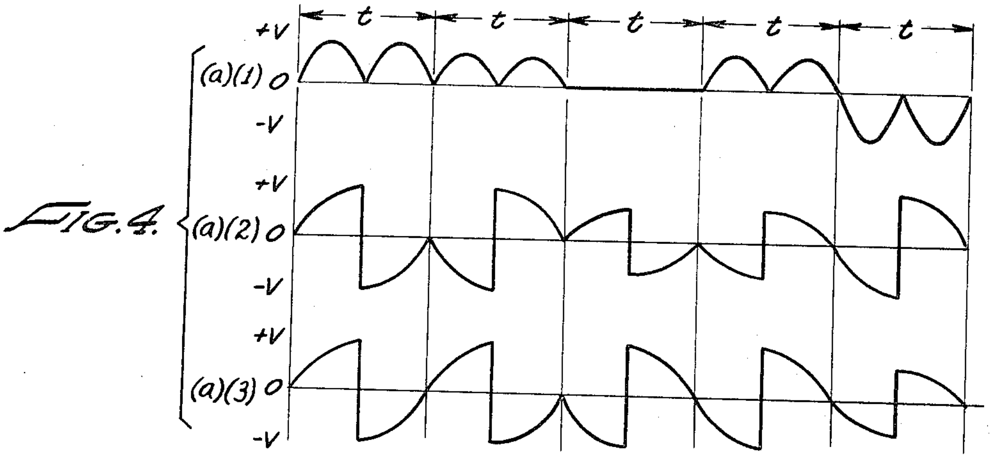
Figure 5A:
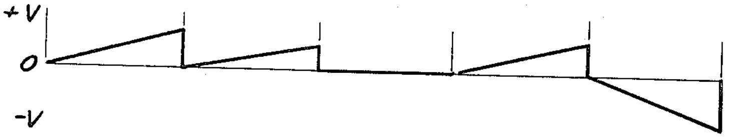
Figure 11:
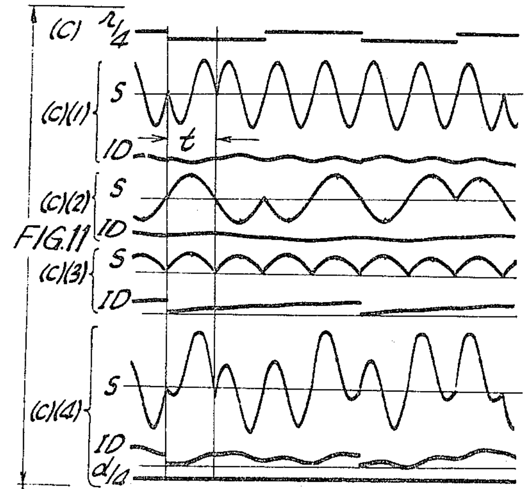
Figure 12:
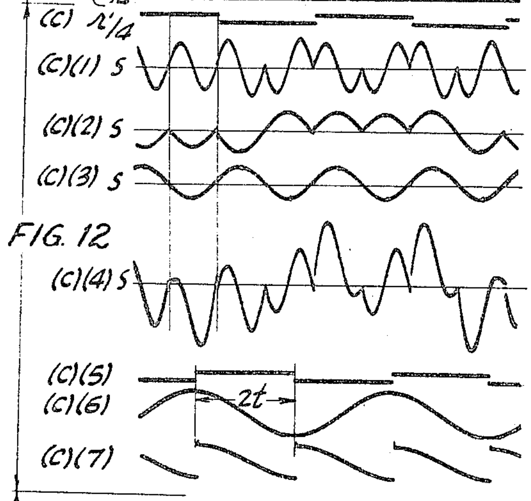
Figure 13:
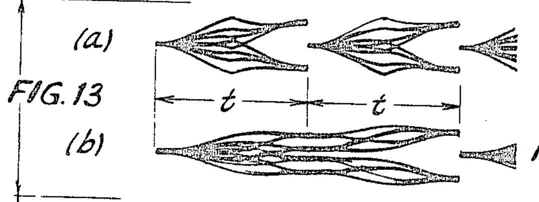
Figure 14:
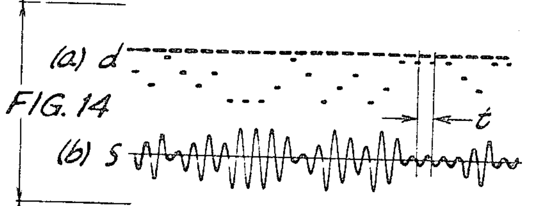
Figure 15:
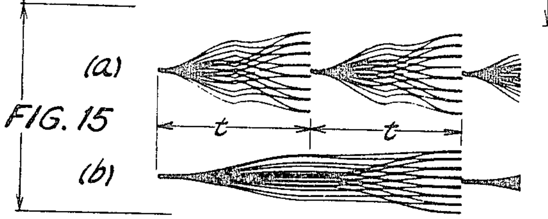
Figure 8:
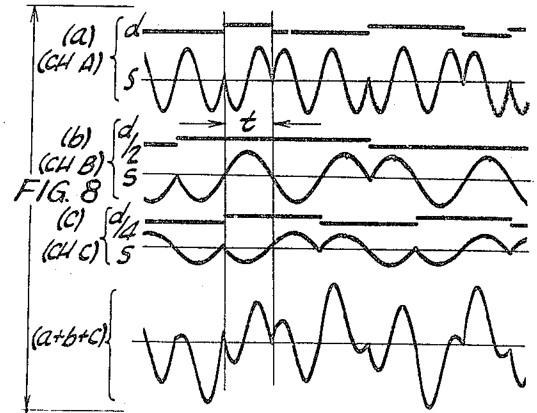
Figure 9:
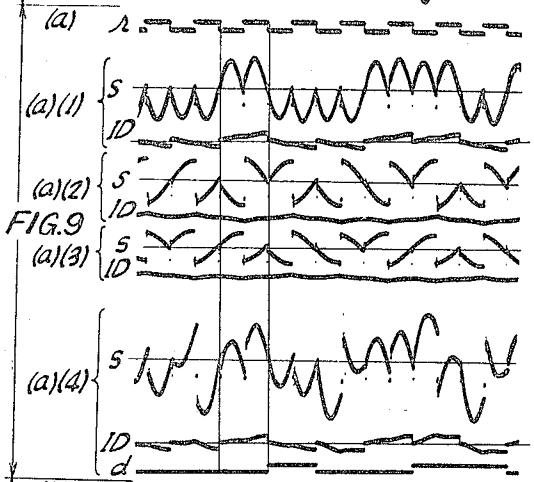
Figure 10:
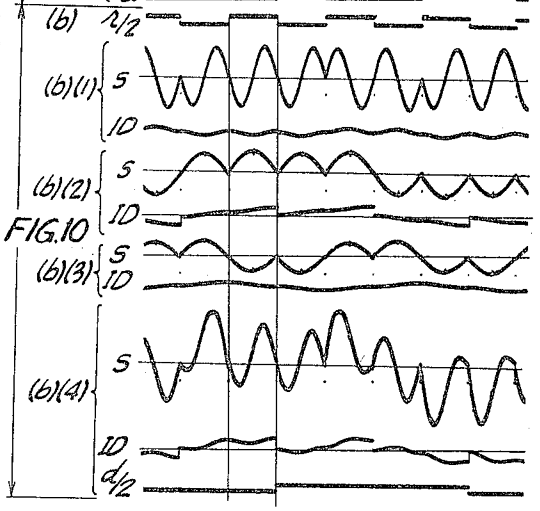
Figure 18:
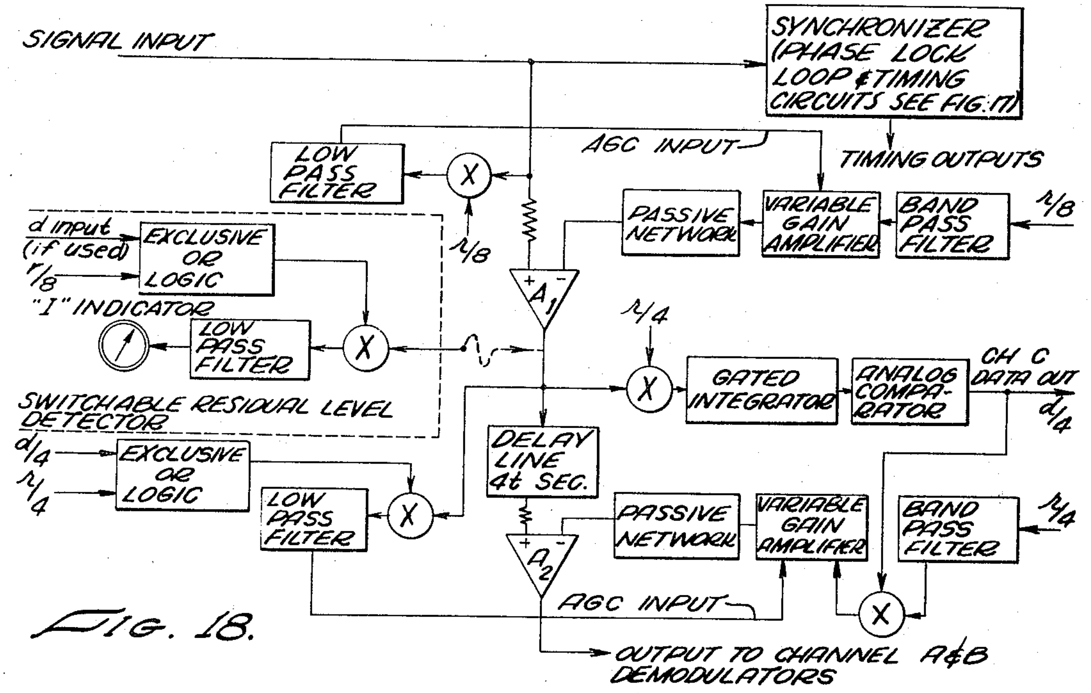
Figure 19:
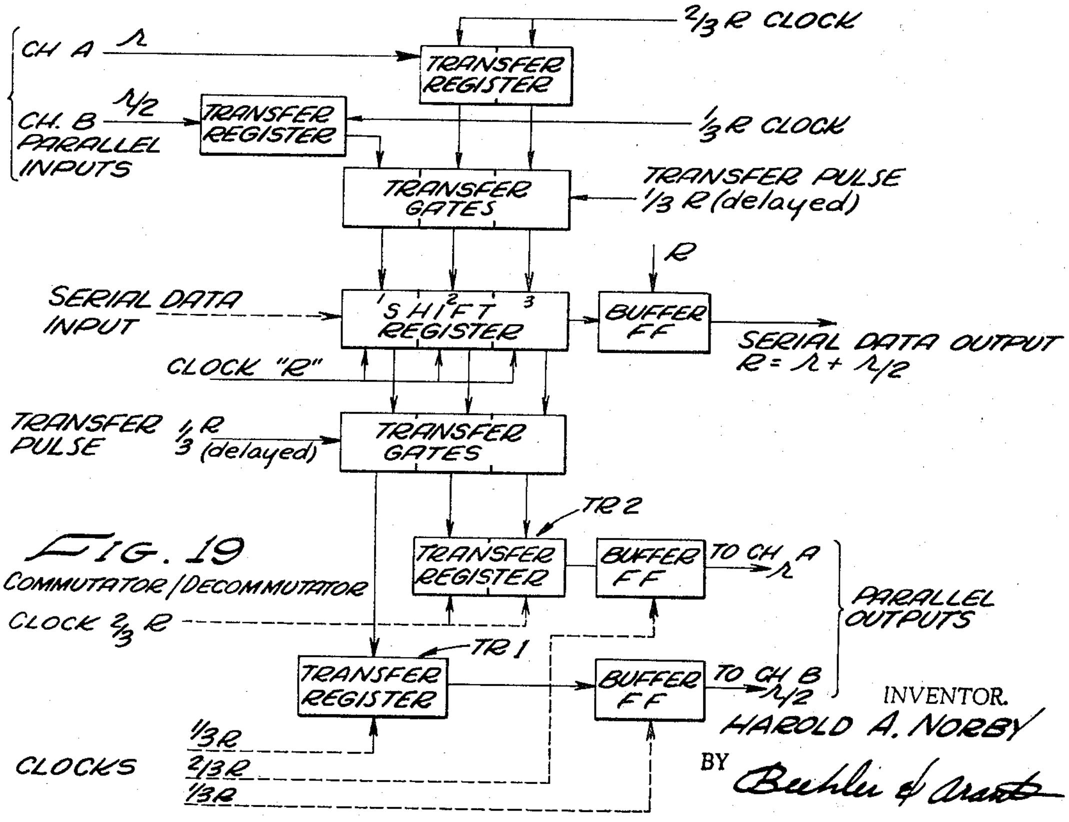
Figure 20:
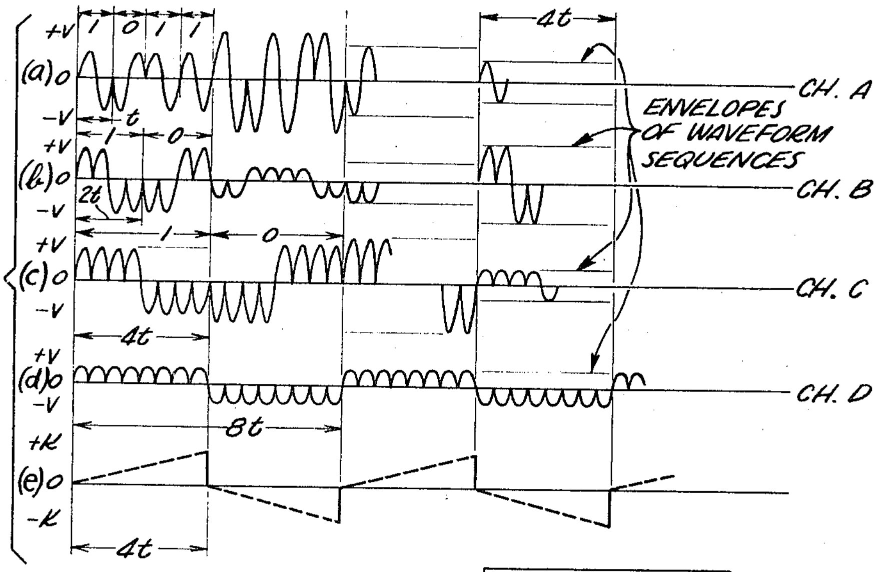
Figure 21:
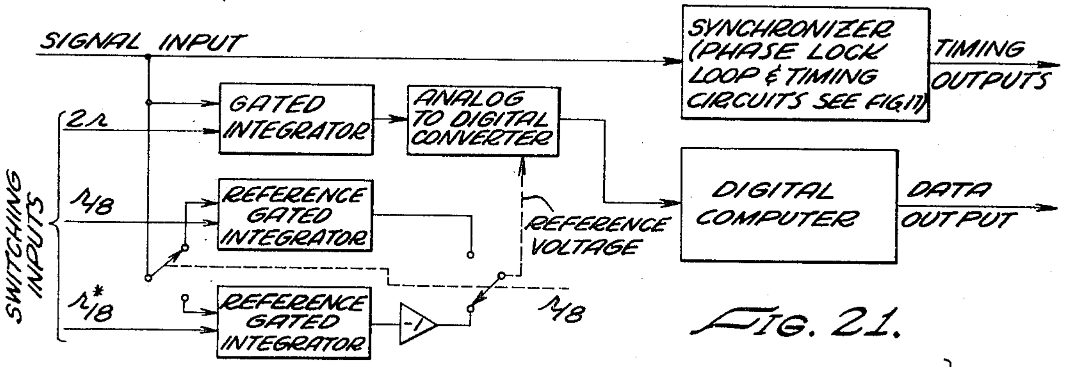
Figure 22:
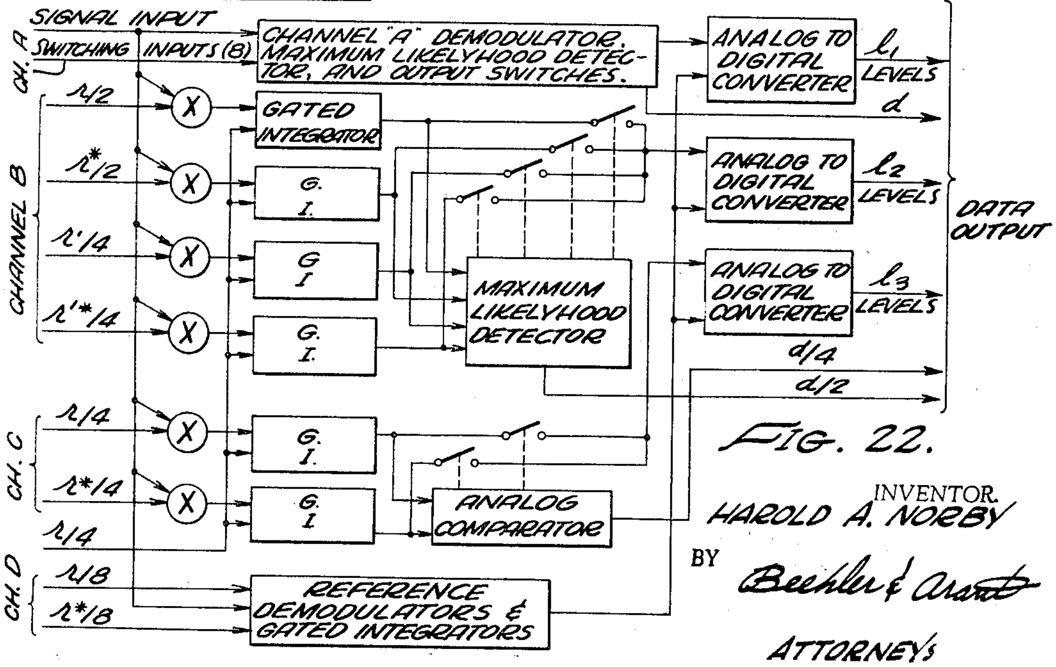

FIGURES 2(*b*) and 2(*c*) illustrate other signal series, representing other series of data samples, not shown, and which in accordance with the invention are applied to a medium concurrently with the signal series of FIGURE 2;

FIGURE 3(*a*) illustrates a switching function which is applied to the composite signal for detecting the signal series of FIGURE 2(*a*);

FIGURES 4(*a*)(1), 4(*a*)(2) and 4(*a*)(3) illustrate the effect of the switching function of FIGURE 3(*a*) on the composite signal in reproducing in modified form the signal series of FIGURES 2(*a*) and 2(*c*), respectively;

FIGURE 5(*a*) illustrates the final recovery of the data of FIGURE 1(*a*) from the rectified pulse series of FIGURE 4(*a*)(1);

FIGURE 6 illustrates in block diagram form suitable input equipment for generating the wave forms of FIGURES 2(*a*), 2(*b*) and 2(*c*) and concurrently applying same to a transmission or recording medium;

FIGURE 7 illustrates in block diagram form suitable output equipment for recovering and detecting the information;

FIGURE 8 illustrates binary data and resultant signal wave forms corresponding to those of FIGURE 2 and also shows the composite signal obtained when the individual channel wave forms (A, B and C) are added algebraically;

FIGURE 9 illustrates the outputs of a Channel A demodulator and corresponds to the wave forms of FIGURES 3 and 4 for the case of binary data. Included also are gated integrator output wave forms corresponding to FIGURE 5(*a*);

FIGURES 10 and 11 provide the same illustrations as FIGURE 9 but for Channel B and C demodulator outputs, respectively;

FIGURE 12 shows the response of a Channel C demodulator when this channel is used for phase synchronization or timing reference purposes;

FIGURE 13 illustrates the superposition of a multiplicity of gated integrator output wave forms, for pseudorandom binary data, for Channels A and B;

FIGURE 14 shows the relationship between amplitude quantitized data samples (four level, unipolar) and the resultant signal wave forms of longer duration than the data samples;

FIGURE 15 illustrates the superposition of a multiplicity of gated integrator output wave forms for multilevel, pseudorandom, bipolar, digital data, for Channels A and B;

FIGURE 16 is a block diagram of a multilevel wave form generator;

FIGURE 17 is a demodulator for same as FIGURE 16;

FIGURE 18 illustrates demodulator means whereby several wave form series, less restrictive in format than those illustrated in FIGURES 2 and 8, may be effectively utilized;

FIGURE 19 shows how a single serial digital data input channel may be distributed among two channels of lower but related periodicity. The inverse process is also illustrated;

FIGURE 20 illustrates the use of various combinations of a single wave form to represent multiple data channels having geometrically related periodicity. As shown, the amplitudes of groups of these wave forms can be made variable to convey further information in such a manner that one of the channels may be separately demodulated for use as an amplitude reference;

FIGURE 21 illustrates digital computer means for demodulating the several channels of FIGURE 20; and FIGURE 22 shows yet another type of demodulator for the signals of FIGURE 20.

In the description to follow, the terms "bipolar pulse" and "doublet" are used synonymously to indicate a waveform of predetermined characteristics having a positive portion and a negative portion which together make up a cycle or period of a series of bipolar pulses. The characteristics of the bipolar pulses will be defined more specifically hereinafter. However, it may be considered that a bipolar pulse may be reversed in polarity by reversing the order in which its positive and negative portions appear. Alternatively, the reversal of polarity may be considered a simple inversion of 180° phase shift.

A unique method of multiplexing sampled data is described in the following paragraphs. This method provides better utilization of a given transmission band width than existing methods and is especially applicable where the transmission or recorder band width is several octaves wide but does not extend to zero frequency (D.C.). The method combines both time and frequency multiplexing in that the data is applied to several frequency channels concurrently in a time-synchronized manner so as to reduce cross talk between channels to substantially zero.

The advantages of the method can be understood by reference to the drawings. FIGURE 1(*a*) represents a series of sampled data pulses each of length *t* and having respective amplitudes $V_1$, $V_2$, $V_3$, etc. Usually such pulses have a relatively short length, but in this instance the pulses have been widened to facilitate carrying out the method of the present invention. The data pulses are then used to control a wave form generator so as to produce doublet pulses of length *t* and whose respective amplitudes are proportional to the respective data pulse amplitudes, as shown in FIGURE 2(*a*). Note that a zero amplitude data pulse produces a zero amplitude doublet and a negative data pulse produces an inverted doublet pulse. The positive and negative parts of each doublet pulse are approximately equal in area, hence the average value of a doublet series is zero. This first doublet series is referred to as Channel A.

Similarly other data pulses of length 2*t* are used to control a second set of wave form generators thereby producing a second series (Channel B) of doublet pulses each having a length 2*t*, as shown in FIGURE 2(*b*). This process can be continued indefinitely providing additional channels having doublet lengths 4*t*, 8*t* . . . $_{2}(n-1)_{t}$, where *n* is the total number of channels, although in the third and succeeding channels the pulse form is modified as subsequently explained. The pulse repetition rates of the several channels are thus geometrically related and the total data capacity of *n* channels approaches the limit of the following geometric series for large *n*, Thus:

$$\text{Total data rate}=\frac{1}{t}(1+\tfrac{1}{2}+\tfrac{1}{4}+\tfrac{1}{8}\ .\ .\ .+\frac{1}{_{2}(n-1)}\rightarrow 2/t \text{ as } n\rightarrow\infty$$

All of the various signal series constituting the channels A, B, C, etc. are concurrently applied to a common transmitting or recording medium.

The arrangement described minimizes cross talk between channels as can be understood by referring to FIGURES 3(*a*) and 4(*a*). Consider first a demodulation process for the doublet series of FIGURE 2(*a*). A coherent or synchronous demodulation process is required; such a process consists essentially of multiplication, whereby the composite signal to be demodulated is multiplied by a local reference of the proper phase. In this case, for simplicity, the local reference is the square wave of FIGURE 3(*a*), and the demodulator consists simply of a bipolar switch which closes in one sense (+) during the first half of the interval *t* and in the opposite sense (—) during the second half. The result is shown in FIGURE 4(*a*)(1), and it is obvious that during each interval *t* the demodulator output has an average value which is proportional to the corresponding original sample $V_1$, $V_2$, etc. of FIGURE 1(*a*). The same switching function, however, operating on the portions of the composite signal corresponding to the doublet series of FIGURES 2(*b*) and 2(*c*) produces an average output of zero over the interval *t* as seen in FIGURES 4(*a*)(2) and 4(*a*)(3), hence channels B and C do not produce cross talk in channel A. The converse is also true as can be observed by applying a switching function of period 2*t*, 4*t*, etc. to the series of FIGURE 2(*a*). Also, it can be shown, that given a linear network, the same switching operations applied to a summation of the channel wave forms give identical results. It is necessary to average the demodulator output over the interval *t*, 2*t*, 4*t*, etc., according to channel, to obtain a true average. This can be accomplished by a gated integrator, which is permitted to operate over the desired interval and is then discharged to zero at the end of the interval. The output is, of course, measured just prior to discharge. A gated integrator output for Channel A is shown in FIGURE 5(*a*).

Doublet wave forms must have the proper characteristics to produce zero cross talk. The doublet of FIGURE 2(*b*) is seen to be identical to that of FIGURE 2(*a*) except for length while FIGURE 2(*c*) is different. Zero cross talk requires that the doublets of length 2*t* be symmetrical about their quarter periods and those of length 4*t* be symmetrical about their one-eighth periods, etc. In the general case, orthogonality (zero cross talk) is maintained by the general condition that bipolar pulses (doublets) of each series having repetitive periods greater than the series of pulses having the shortest periods are symmetrical about the midpoints of the periods of those bipolar pulses of each series of pulses having shorter periods. Square waves, of course, satisfy this condition, but they become modified by passage through a band width restriction with the result that the zero cross talk criteria may become lost. A simple set of wave forms which do satisfy the cross talk criteria are those shown in FIGURES 2(*a*), 2(*b*) and 2(*c*). Other channels of doublet length 8*t*, 16*t*, etc., can be constructed by properly arranging several half sinusoids of length *t*, similarly to Channel C.

There are, of course, many different wave forms which will satisfy the zero cross talk criteria as well as many more which may have sufficiently low cross talk in practice. It is also possible to use more than one doublet pulse to represent each data sample, thus one data pulse $V_1$ might be represented by two doublets of total length 2*t* if desired.

A wave form generator, which is capable of generating the doublet pulse series of FIGURES 2(*a*), 2(*b*) and 2(*c*) is shown in FIGURE 6. Each channel includes a balanced modulator which can produce doublets of either polarity and arbitrary amplitude corresponding to the particular applied data pulse.

The input to the balanced modulator can be a simple oscillator if sinusoidal doublets are desired, or an arbitrary wave form can be produced by applying a driving function, having the correct repetition rate for the channel involved, to an active, passive, linear or non-linear network or combination thereof. FIGURE 6 illustrates a square wave driving function which is divided down in frequency successively by two for each channel. A simple filter provides the sinusoidal shape for Channels A and B while a rectifier and balanced gate (bipolar switch) are used to produce the Channel C wave form.

The entire system can be driven from an external clock pulse source or an internal oscillator can be used.

The balanced modulator outputs are added in the desired proportions and applied to the transducer, transmitter, transmission network, or other medium being used. The phasing networks included in FIGURE 6 are used to maintain the proper time-synchronized relationship between channels which minimizes cross talk at the point of demodulation. One or more equalizing networks can be used, if desired, to compensate for frequency or phase distortion in the transmission or recording medium, which might otherwise introduce cross talk.

FIGURE 7 illustrates a demodulator unit which can recover the original sampled data pulses. Balanced gates (bipolar switches) are provided for each channel and these are driven by square waves whose timing is obtained in a manner similar to that of FIGURE 6. It is necessary to synchronize these square waves with the incoming doublet series in order to accomplish demodulation. Such synchronization can be accomplished by a manually set clock time standard, or a synchronizing circuit which derives its information either from the composite signal or from a separate frequency channel of period $8t$, $16t$, etc. as desired.

The balanced gates demodulate the several series of doublets separately as explained previously. Gated integrators measure the average value of each doublet, thus permitting recovery of the original data in a manner common to other time multiplex transmission systems.

The balanced gates can also be replaced by time product demodulators driven by locally generated replicas of the desired wave forms.

The various input data channels can be obtained from a single time multiplexed channel by means of a commutator which distributes data pulses to each doublet channel in accordance with its capaicty. Thus, each commutator cycle would provide four data pulses to Channel A, two to Channel B and one to Channel C. A similar commutator can also be used to recombine the demodulator data into a single channel if desired.

FIGURES 8 through 12 illustrate one set of several possible waveform series which could be used and shows that they may be orthogonally demodulated, i.e., without crosstalk between channels. These waveforms, which are sinusoidal segments, represent binary data, and are reproductions of actual oscilloscope photographs with time as the abscissa and voltage ($\pm$V) as the ordinate. These figures are thus equivalent to FIGURES 1 through 5, the latter however represented data samples that could have had any amplitude, including zero, between +V and −V.

FIGURES 8(*a*), (*b*), and (*c*) show binary data and signal sequences, *d* and S respectively, for each channel A, B, and C. In this case C is not arranged for the transmission of data but is used for synchronization. The binary sequence of channel A is seen to be 00100110 while that for B is 01100. Positive data sequence segments, i.e., logical "ones," can be seen to produce initially negative-going doublet pulses while "zeros" invert the phase of the doublet pulse produced. Signal waveform voltages are proportional in each case corresponding to those generated at points 2(*a*), (*b*), and (*c*) of FIGURE 6 and in FIGURE 8 have been adjusted so that each would provide approximately the same performance in the presence of additive Gaussian noise. Since the relative maximum data rates of channels A, B, C normalized to A, are 1, 1/2, and 1/4 respectively, their amplitudes accordingly should be 1, $\sqrt{2}/2$, and 1/2 respectively. In general the relative amplitudes, or power level, of each of the several series of signal waveforms are adjusted to provide substantially the same actual performance for each. The Gaussian noise case was cited as an example; however where the statistics of some other random disturbance are non-stationary, channel proportioning may be adapted to the changing environment by sensing the variations of the appropriate statistical parameters of the disturbance, e.g., mean, variance, etc., and using this information to control the proportioning of channel signals. Data waveforms *d*, *d*/2, and *d*/4, correspond to those applied to points 1(*a*), (*b*) and (*c*) of FIGURE 6 but their actual voltages have no significance since they merely represent each of two arbitrary voltage levels corresponding to logical ones and zeros.

FIGURE 8(*a*+*b*+*c*) is the composite signal corresponding to the sum of the channel A, B and C waveforms. The composite signal sequence must have zero average value since each of its components is so constrained. However, data samples, whether binary, multilevel, or continuously variable in amplitude, are not so constrained.

FIGURE 9(*a*) shows the Channel A demodulator switching function *r* corresponding to FIGURE 3(*a*) and point 3(*a*) of FIGURE 7. FIGURES 9(*a*)(1), (*a*)(2), and (*a*)(3) illustrate the demodulator outputs S and gated integrator outputs "ID," from "Integrate and Dump," for each of the separately applied signal inputs of FIGURE 8(*a*)(*b*) and (*c*). The S outputs correspond to FIGURE 4(*a*)(1), (*a*)(2), and (*a*)(3) respectively, and correspond to those which would be obtained at point 4(*a*), FIGURE 7. Demodulation is accomplished by reversing the phase of the input when the switching function is negative.

FIGURE 9(*a*)(4) S is the demodulator output for the composite signal, ID is the gated integrator's output and is the recovered binary data which is seen to be identical to the original data except for a delay equal to one bit length. The ID output of FIGURE 9(*a*)(1) corresponds to FIGURE 5(*a*) while FIGURE 9(*a*)(4) ID corresponds to A output shown at point 5(*a*) of FIGURE 7. The gated integrator is "dumped," i.e., discharged to zero at the appropriate transition of the switching signal, *r*, negative-going in FIGURE 9(*a*) and positive-going in FIGURE 3(*a*). Note that the sloping portions of the ID waveforms are generally not straight lines although they are approximately so when only one channel signal is present. With composite signal present, the gated integrator generally charges quite non-linearly but reaches the same value at the dumping instant in either event. This effect can be observed from the ID waveforms of FIGURES 9(*a*)(4), 10(*b*)(4), and 11(*c*)(4).

The orthogonality of the channels is illustrated by the fact that the ID output is seen to differ from zero, at the sampling instant, only when the Channel A signal is present at the demodulator's input. Thus the crosstalk between channels is zero.

FIGURE 10, which illustrates Channel B demodulator outputs, corresponds in every respect to FIGURE 9, the circuits involved being identical except for the switching signal *r*/2 (FIGURE 10(*b*)) which has twice the period of *r* (FIGURE 9(*a*)). As shown in FIGURE 10, the ID output is seen to differ from zero only when the B channel signal is present at the demodulator's input. The data output *d*/2 is seen to correspond with *d*/2 of FIGURE 8(*b*) except for a one bit delay.

FIGURE 11 illustrates the Channel C demodulator outputs, as if it were used for the demodulation of data, and corresponds to FIGURES 9 and 10. Since Channel C is in this case used for synchronization purposes, its original data input, FIGURE 8(*c*) *d*/4 is actually only a periodic switching function ($r'/4$) which produced a Channel C signal corresponding to the transmission of all ones. FIGURE 11(*c*)(4) shows that all ones are demodulated when the Channel C signal is present at the demodulator's input. The means whereby the square wave switching functions of period *r*, *r*/2, *r*/4, etc., and their quadrature functions denoted by $r'$, $r'/2$, $r'/4$ etc., are derived later.

The outputs of the channel demodulators, A, B and C, are seen to be proportional to the amplitudes of the corresponding channel signals, i.e., $A>B>C$, and were equal gated integrator time constants used, the integrator outputs would remain proportional to the areas of the doublet pulses generated in each channel. Since area is proportional to amplitude, for fixed time duration, sample amplitudes would thereby be preserved. However, the maintenance of the original data sample amplitudes through the entire system is not easily illustrated by FIGURES 8 through 12 since binary data was used for simplicity.

FIGURE 12 shows the Channel C demodulator's outputs when a quadrature switching function $r'/4$ (FIGURE 12(*c*)) is applied in order to recover phase or timing information for synchronization purposes. Here no gated integrator is used since the demodulator's output is coupled to a phase lock loop after appropriate filtering in a manner commonly employed for this purpose. FIGURES 12(*c*)(1), (*c*)(2), (*c*)(3), and (*c*)(4) illustrate its outputs for Channels A, B, C and composite signal respectively. All have zero average value when the switching function is correctly timed with the demodulator's inputs as is shown.

FIGURES 12(*c*)(5), (*c*)(6), and (*c*)(7) illustrate the case where the Channel C periodic component within the composite signal is enhanced by filtering and the resultant signal applied to a demodulator for use in a phase lock loop. These waveforms are the $r'/4$ switching signal, the filtered signal, and the output of the demodulator respectively.

FIGURE 13 illustrates the superposition of a multiplicity of gated integrator outputs with the time scale equal to that of two binary data samples in Channel A and one in Channel B, FIGURES 13(*a*) and (*b*) respectively. Channel C is again used for synchronization. The gated integrator's output ID at the end of the interval is seen to have only two values—one corresponding to binary one and the other to binary zero.

FIGURE 14 shows a sequence of unipolar (negative) data samples *d* which have been quantitized into 4 amplitude levels. S is a corresponding sequence of doublet pulses, each of longer duration than the original data samples, also having 4 amplitude levels. Since the data is unipolar, all doublet pulses have the same phase relationship, as is shown. Data samples are seen to just precede the start of each corresponding doublet pulse, but the actual timing is not significant since an arbitrary delay can exist between the instant of sampling and the generation of a doublet pulse of corresponding amplitude and phase (polarity). Each data sample's amplitude would normally be stored, perhaps digitally as is illustrated later, for a period of time equal to the duration of one or more doublet pulses. Such storage is necessary to insure that the amplitude of each doublet pulse is held constant within its own duration, because amplitude variations within the duration of a doublet pulse can alter its waveform so as to introduce crosstalk. The "stretching" of a short sampling pulse is a common procedure and it is sometimes stated that such samples are "boxcarred," i.e., lengthened.

FIGURE 15 shows multilevel gated integrator outputs, for Channels A and B respectively, which correspond to the two level (binary) case illustrated in FIGURE 13. The waveforms of FIGURE 15 represent two series of data samples, four levels of each polarity in this case, similar to those illustrated in FIGURE 14, which have been generated, demodulated and integrated and dumped. FIGURES 14 and 15 therefore illustrate that the amplitudes of the original data samples are preserved, except for a proportionality constant, through the entire system. Channel C was also used for synchronization in this example.

FIGURE 16 illustrates an implementation of a three channel digital data modulator. To provide timing synchronism with an external source of clock pulses, the internal primary frequency source is made a voltage controlled oscillator (VCO). The VCO is phase-locked to the external clock source by the action of a phase detector, loop filter and frequency scaling network $k_1$ operating together with the VCO to form a phase locked loop. The circle enclosing the X denotes a balanced gate which is a form of product modulator or phase detector.

The VCO output is used to drive a timing circuit whose function is to generate periodic signals of frequencies $r$, $r/2$ *and* $r/4$, etc. for subsequent use in waveform generation and modulation. The required frequencies are generated by scaling the frequency of the VCO by a factor, $k_2$, whose value is a function of the rate of the external clock source with respect to the rate or periodicity of the lowest channel used. The output of the frequency scaler triggers a divide-by-two flip flop circuit which produces at its outputs symmetrical square waves of frequency $2r$ which are in phase opposition to each other. The required signaling frequencies are generated from $2r$ by dividing it by two to produce frequency $r$, then dividing $r$ by two to produce $r/2$ and dividing $r/2$ by two to produce $r/4$. Each successive frequency division is performed by an identical pair of flip flop circuits, triggered from the outputs of the preceding flip flops. Division starts from $2r$ and two separate flip flop circuits are used at each stage of the division in order to generate both in-phase I and quadrature Q square waves at each switching and signaling frequency. The asterisk denotes phase opposition; i.e., $r^*$ is the inverse of $r$, while $r'$ denotes the Q wave.

Outputs $r$ and $r/2$ are each converted to sinusoids of reference phase zero by means of a bandpass filter which drives the balanced gates shown in FIGURE 16. The data inputs to be phase reversal encoded, $d$, $d/2$, and $d/4$ cause the balanced gates to reverse the phase of the sinusoids (180° from phase zero) whenever a data bit is logical zero. Note that $d$ is the sampling rate and $d=r$, $d/2=r/2$ etc.

If Channel C is not to send data, either the input $d/4$ may be disconnected, or the exclusive-or logic (shown dotted) omitted, and the "unmodulated" Channel C waveform is then transmitted. This "carrier" which is generated by switching the phase of sinusoid $r/2$ with the quadrature square wave $r'/4$ is then periodic at rate $r/4$. Conversely, data phase reversals are accomplished by the exclusive or logic, which is logically equivalent to the balanced gate used for waveform phase modulation and is sometimes called a modulo two adder (denoted by the $\oplus$ sign). Thus $r/2 \oplus r'/4$ is equivalent to saying that the output changes only when the polarity of the inputs differ. The signal outputs of the balanced gates are then algebraically added in a summing amplifier and the resulting composite signal transmitted through or recorded upon a suitable medium.

To account for possible distortion in the medium, and to limit the spectral content of the transmitted signal to those frequencies which are passed by the medium without substantial alteration, each channel may be pre-distorted and filtered in a passive network before summation. For example, the passive network and/or the impedance Z, may be chosen so as to pre-distort the signal in a manner inverse to that of the medium such that the received signal is essentially undistorted. In the simplest case the passive networks and the impedance Z are resistances of appropriate value.

Data transmission capacity may be increased if, in addition to the phase modulation, the amplitudes of one or more of the channel signals are also used to carry information. This may be accomplished, as also shown in FIGURE 16, dotted lines, by applying $m$ "amplitude" data bits to a digital-to-analog converter (DAC) to produce one of $2^m$ discrete amplitude levels. (Zero level must be excluded since that would cause no signal to be transmitted on the given channel, thereby causing the loss of phase reversal information also). The DAC output drives an amplitude modulator, along with the phase reversal modulated waveform. Using the phase modulated channel waveform as a "carrier," the amplitude modulator alters the magnitude of each doublet pulse in direct proportion to the DAC's output. The outputs of the amplitude modulators are then summed and the fully encoded composite signal is transmitted. The total data transmission rate thus becomes equal to the sum of the phase reversal and amplitude modulation rates. The former has a maximum rate of $d$, $d/2$, $d/4$ etc. for Channels A, B, and C respectively while the latter have equal maximum "word" rates. The number of binary digits (bits) in a word equals $m_1$, $m_2$, $m_3$ etc. In general, the number of amplitude levels which may be successfully encoded is determined by the noise level at the demodulator or the degree of intersymbol interference introduced by the transmission or recording medium. Intersymbol interference results when amplitude, phase or multipath distortion in the medium causes previously transmitted doublet pulses (symbols) to overlap those arriving later in time.

FIGURE 17 is an illustration of a digital data demodulator whose function is to recover the digital data encoded in the amplitude and phase of the multiplexed channel waveforms.

The incoming signal consists of the algebraic sum of three channel waveforms. The medium through which the input signal is passed may introduce distortion into the signal. A major source of distortion may result from the bandwidth restrictions and non-uniform time delay versus frequency characteristics of the medium. Inasmuch as these distortions result in intersymbol interference which tend to disrupt the mutual orthogonality of the multiplexed channels, the first step of the demodulation process is to pass the composite signal through one or more equalizing networks. The equalizer is adjusted to compensate for the distortions by adjusting its parameters to effect a transfer characteristic which is essentially the inverse of that of the medium. The equalizer thus attempts to "re-distort" the signal towards its original form. The equalized signal is then amplified to a fixed level in a gain-controlled amplifier and demodulated to recover the data.

In order to recover the encoded data, a phase coherent reference is required for each channel. This coherent reference may be obtained by phase-locking the VCO to the phase of the periodic component of the lowest channel (C) and driving the timing circuits with the VCO, as previously described. The references derived from the timing circuits are then coupled to balanced gates as shown in FIGURE 17. If none of the channels contain synchronization information, i.e., none contain periodic components, it is necessary to obtain reference signals by other means. For example, outputs from one or more of the Channel Quality Measurement and Control Circuits also shown in FIGURE 17 and discussed later could be used to drive the phase lock loop.

The essence of data recovery from the composite signal is the ability of the signal to be separated at the receiver into three non-interacting channels. This feature is a direct result of the prearranged orthogonal relationship between the waveforms in each channel. The channel separation and data recovery is performed by balanced gates and gated integrators as may be seen from the following. True product demodulators could of course be employed instead of balanced gates (bipolar switches).

The input signal is given by $e_{in}(t)=f_1(t)+f_2(t)+f_2(t)$, where the $f$'s are the modulated waveforms of each channel. The circuit properties of the balanced gate are such that its output signal is equal to the product of the input signal and the reference input. Thus, the output of each balanced gate may be represented by:

$$e_{oi}(t)=e_{in}(t)f_{Ri}(t) \qquad i=1,\ 2,\ 3$$

where $f_{Ri}(t)$ is the coherent reference associated with channel $i$. The gated integrator is a device which integrates its input signal for an interval $t_i$ and is then discharged to zero in infinitesimal time, with integration repeated over each succeeding time interval. The output of the gated integrator just prior to discharge is thus given by $$I_i(t_i)=\int_0^{t_i} e_{oi}(t)dt \qquad i=1,\ 2,\ 3$$

If the expression for $e_{oi}(t)$ is substituted in the equation, there results, after simplification:

$$I_i(t_i)=\int_0^{t_i} f_i(t)f_{Ri}(t)dt+\int_0^{t_i} f_2(t)f_{Ri}(t)dt+\int_0^{t_i} f_3(t)f_{Ri}(t)dt \qquad i=1,\ 2,\ 3$$

Since the modulated waveform of each channel is orthogonal to the reference of every other channel over the interval $t_i$, and since the waveforms, $f$, possess the symmetry properties of the invention, all terms in the equation for $I_i(t)$ are zero except the term:

$$\int_0^{t_i} f_i(t)f_{Ri}(t)dt \qquad i=1,\ 2,\ 3$$

This term (the sampled output of gated integrator $i$) however, is an analog representation of the $i^{th}$ channel signal wherein its polarity indicates the phase of each doublet pulse and the magnitude indicates which of $2^m$ amplitude levels were transmitted. The digital data is recovered from the analog signal output of each channel's gated integrator with an analog-to-digital converter (ADC). The ADC output is thus one word per doublet pulse consisting of $m$ bits and sign ($\pm$).

The phase reversal data, once recovered, may then be used to obtain a quantitative indication of channel quality to be used for automatic gain control (AGC), as further synchronization information for the phase lock loop, and as a criterion for the proper adjustment of the equalizing network. The AGC voltage is obtained by combining the phase demodulated data $d$, $d/2$, $d/4$, etc. with the associated reference $r$, $4/2$, $r/4$ etc. in an exclusive-or logic circuit, and using the output of the circuit to control a balanced gate. The "signal" input to the balanced gate consists of the composite input signal, delayed by the length of the doublet pulse $1/d$, $2/d$, $4/d$ etc. The output of the balanced gate is then an indication of the magnitude of the signal on the line. This signal is filtered by a low pass filter to retain only the DC component which is subsequently coupled to an indicator and the control input of the AGC amplifier. It is noted that this signal represents the in-phase component I of the channel signal.

The phase lock loop and phase equalization criterion is chosen to be that setting of the equalizer which minimizes the quadrature component Q in the channel being considered as indicated by a meter on other indicating device. The Q component is obtained in a manner similar to that used for the in-phase component. The only difference in the mechanization is the fact that the phase demodulated data $d$, $d/2$, $d/4$ etc. is combined with a quadrature reference $r'$, $r'/2$, $r'/4$ etc. in the exclusive-or logic circuit.

The channel quality measurement and control circuit can be employed on any one, or more, of the channels by appropriate choices of delay $t=1/d$, $2/d$, $4/d$ etc., data input $d$, $d/2$, $d/4$ etc. if any, and either reference input $r$, $r/2$, $r/4$ etc. or $r'$, $r'/2$, $r'/4$ etc.

The operation of this circuit can be better understood by noting that the delay involved in the polarity decision process, when using a gated integrator, is exactly one bit length $1/d$, and this knowledge of polarity can be used to "re-invert" doublet pulses, also delayed by $1/d$, in such a way that a "carrier" without phase reversals can be recovered from the composite input signal. The I term of this carrier represents its magnitude while the Q term is a phase error signal with both defined relative to the reference $r$, $r/2$, $r/4$ etc. The above process could also be accomplished by a pair of balanced gates, the first driven from data, followed by the second driven from I or Q references as appropriate. The first balanced gate could also be followed by a bandpass filter, tuned to the channel frequency, and a limiter to enhance the desired channel frequency for use in deriving the phase error signal. Since both data and reference signals are binary, it is often simpler to use the exclusive-or logic shown than to provide additional balanced gates.

It is implicit in the preceding discussions that the assignment of a channel for synchronization provides the means for insuring the correct recovery of data polarity in each channel regardless of the polarity in which the demodulator is connected to the communications medium. Unambiguous recovery of data polarity can be effected by performing logic operations on the data assigned to each channel and performing inverse logic operations on the demodulated data. For example, combining the data in each channel with the switching function of the synchronization channel in an exclusive-or circuit prior to transmission and performing the inverse operation on the data after they are demodulated will insure unambiguous recovery of polarity.

As was previously discussed, signal series having no other waveform restrictions than geometrically related periodicity, zero average value over the duration of each doublet pulse and equal duration for positive and negative portions are not all orthogonal with respect to each other, i.e., cannot be demodulated without crosstalk. An example of a signal series of this type is a series of sinusoids of period $t$, $2t$, $4t$, $8t$ etc. Only the two series of longest and next longest period can be demodulated without crosstalk from the other members of the series. This can be verified by demodulating said two channels of lowest periodicity from the composite signal by a pair of switching functions having the same period as said channels, in a manner equivalent to that illustrated in FIGURES 3, 4, 9, 10, and 11. This might be termed "one-way" orthogonality in that channels having the two longest periods can be demodulated without crosstalk but the channels of shorter period cannot. This principle is exploited in the arrangement of FIGURE 18 to permit the use of less restricted waveform series.

For the purposes of explanation, we shall again assume four signal series consisting of several sinusoidal waveform segments (doublet pulses) of the type shown in FIGURES 2($a$) and ($b$), of the period $t$, $2t$, $4t$ and $8t$. The latter is to be used for synchronization hence is assumed to be a continuous sinusoid. The other channels may transmit information by periodic phase reversals at a maximum rate of $r=1/t$, $r/2$, and $r/4$, and/or amplitude modulation at rates dependent on the number of levels employed.

First the amplitude of the sync (synchronization) channel is determined by the coherent modulator circuit (driven by $r/8$) shown in FIGURE 18, and is used to reconstruct a replica of the sync channel. Second, this is subtracted from the composite signal in the first differential amplifier $A_1$, so as to eliminate this waveform series at the output of $A_1$. Reconstruction is accomplished by controlling the level of a sinusoid obtained from the filtered square wave of period $r/8$. This was the means (FIGURE 16) previously used for generating waveform series of this type. If desired, a passive network may be employed to further improve the accuracy of the reconstructed $r/8$ signal series. A switchable level detector similar to the I indicator of FIGURE 17 makes it possible to "equate" the $r/8$ inputs to the differential amplifier to achieve maximum "nulling" of this signal series. This detector later can be switched, using $r/4$ and $d/4$ inputs, to the output of $A_2$ for nulling the $r/4$ channel. Once nulling is achieved initially, the AGC devices will adjust for input level variations so that a null can be maintained in actual operation.

The above process can be continued indefinitely, i.e., level measurement, control of the level of a reconstructed signal subtraction of said signal from the composite signal, etc. Where a data modulated channel must be subtracted out, the level measurement process can employ the demodulated data outputs to improve the level measurement and reconstruction processes. Optimum demodulation of data requires a delay equal to the length of the signaling element (doublet pulse) as is inherent in the operation of a gated integrator hence a delay line of the same length is inserted prior to level detection and subtraction. The data output $d/4$ is combined exclusive-or with the squarewave $r/4$ to generate a reference for coherently demodulating the magnitude of the $r/4$ signal series. The exclusive-or operation enables the removal of all data phase reversals and the output DC signal (proportional to amplitude) is filtered and used to control the level of the reconstructed $r/4$ signal series. This reconstruction operates in a manner identical to the data modulator of FIGURE 16 and the resulting level controlled signal is subtracted from the composite signal in the $A_2$ differential amplifier. The delay line maintains correct time relationships between the reconstructed $r/4$ signal and the original $d/4$ signal portion of the composite signal.

The switchable level detector can of course be connected to the output of $A_2$ and when driven by $r/4$ and $d/4$ will indicate correct nulling of this signal series. The above-described process must be continued until only the two signal series of shortest period remain. These can then be demodulated as previously described and illustrated in FIGURE 17.

Many other variations are possible, for example ordinary operational amplifiers can be used for subtraction if the reconstructed waveform is inverted. Thus, $r^*/8$ or $r^*/4$ could be used to drive the bandpass filters, and in the latter case data $d^*/4$ would be used to drive the modulator.

The advantage of the above approach is that a simple sinusoidal waveform, which has a line spectrum, can be used for synchronization in place of the waveform series shown in FIGURES 2($c$) and 8($c$). In practice, since the waveforms of longest period will generally also have the lowest amplitudes, the successive subtraction approach described above may not actually be required. In other words, absolute orthogonality may not be essential, especially for binary, rather than multilevel, data multiplexing.

Each channel, unless used purely for synchronization, requires a separate data input to make full use of the transmission capability. In addition, the bit rates of the digital sequences will usually be geometrically related to each other (by the factor 1/2).

If it is necessary to accept digital data from sources whose bit rates are different from the individual channel rates, it becomes necessary to insert a device between the data source and the several channel inputs. This device is called a commutator/decommutator and is illustrated in FIGURE 19 for the instance of a three channel system utilizing only Channels A and B for data. Dotted lines illustrate decommutation inputs, solid lines commutation. The former term is used where a single signal is distributed among several channels, the latter term has the opposite meaning.

If it is assumed that the frequency of the unused channel is $r/4$ then the maximum rate at which channels A and B will transmit data is $r/2$ and $r$ bits/sec. respectively. Thus the combined data transmission rate of this system is $(1\frac{1}{2})r$ bits/sec. Under these circumstances it will be possible to transmit the input sequence at the rate of R bits/sec. by arranging to multiplex ⅔ of the input bits on Channel A and the remaining ⅓ on Channel B. To do this a basic frame is set up in which 2 bits on Channel A and one bit on Channel B are transmitted in the time interval that 3 input bits occur, or, in a time $3/R$ sec. This is accomplished by continuously shifting the input bits through a 3 stage shift register at rate R. For purposes of discussion the input bits are labeled in the following manner to indicate the frame structure:

**A1, B1, C1, A2, B2, C2 . . . A*i*, B*i*, C*i* . . .**

where:

A$i$, B$i$, C$i$ are the three bits in frame $i$

Whenever bits C, B, A, are in stages 1, 2 and 3 respectively of the input shift register the contents of stage 1 are transferred to TR1 and the contents of stages 2 and 3 transferred to TR2. Each transfer register (TR) now contains a portion of the input bits. The transfer registers are then serially shifted at the rates (⅔)R and (⅓)R to provide the serial data inputs for Channels A and B respectively. The buffer flip flop (FF) storage elements are employed to enable transfer operations to take place without interference with bits being utilized simultaneously elsewhere.

Although illustrated for the case of 2 data transmitting channels, it will be recognized that the technique may be extended to the general case of $n$ geometrically related channels by replacing the input register of 3 stages with one of $2^n-1$ or $2^{n-1}-1$ stages respectively depending upon whether the lowest channel is used or not, and having the contents of the input register parallel transferred into $n$ (or $n-1$) transfer registers each having $2^{(j-1)}$ stages where $j$ is the position of the channel being considered relative to the lowest data carrying channel, i.e., the transfer register for the upper channel in a 4 channel system would have 4 stages, if the lowest channel did not carry data and 8 stages if it did.

Where amplitude modulated channels are also employed, input bits must be distributed into parallel storage registers for each channel with one bit determining the phase, and the remainder the amplitude of each doublet pulse. Where data is encoded in both amplitude and phase the data rates between channels may no longer be geometrically related hence appropriate adjustments of clocking rates and register size must be made. These changes would not present a problem to one skilled in the art of digital circuit design.

FIGURE 20 illustrates four series of doublet pulse signal sequences, the first series A (FIGURE 20($a$)) employing doublet pulses of periodicity (length) $t$, and vertical symmetry about the midpoints of its ½ periods; the second series B (FIGURE 20($b$)) having doublet pulses of length $2t$ and vertical symmetry about the midpoints of its ¼ periods; the third series C (FIGURE 20($c$)) having doublet pulses of length $4t$ and vertical symmetry about the midpoints of its ⅛ periods, etc. Each waveform element of each of the series can therefore have the same shape but those of each series utilize a different number and polarity of elements. Information is conveyed by means of phase reversals at a maximum data rate of $r=1/t$, $r/2$, $r/4$ for channels A, B and C. While Channel D carries no information, as illustrated, but is used for synchronization and amplitude reference purposes at the demodulator. Note the binary data sequences of 1, 0, 1, 1; 1, 0; and 1, 0 for Channels A, B and C respectively. Additional information can be conveyed by amplitude modulating each of the signal series A, B and C in groups $4t$ in length.

FIGURE 20($e$) illustrates the output of a gated integrator to the composite signal $(A+B+C+D)$. It can be seen that the gated integrator would not respond to the signal series A, B and C since their average values are each zero over the interval $4t$.

The peak output of the gated integrator K is thus proportional only to the average value of the 4th signal series D over the interval $4t$, and said series can be used as an amplitude reference to improve the accuracy and/or to reduce the sensitivity of the demodulator to changes in medium loss or to variations in signal level. The significance of the dotted lines of FIGURE 20($e$) is that the gated integrator will not charge at a constant rate but will, in general, follow a different path for each different combination of data bits within the intervals $4t$, toward its final value K. Channel D can also be employed as a phase and/or a timing or framing reference as was previously described.

Different numbers of doublet pulses than is illustrated in FIGURE 20 can be included within each sequence (group) to be amplitude modulated. An advantage exists for the combinations shown in that the sequence length is equal to the minimum reference integrating time ($4t$) in each case. Noise and level perturbations taking place within this interval will be self-compensating for some mechanizations. As is common with other methods, the number of amplitude levels which can be resolved in a digital system, or the accuracy for analog pulse amplitude modulation (PAM) will be dependent on the signal-to-noise ratio at the demodulator. It is also sometimes desirable to amplitude modulate groups of doublet pulses, rather than single pulses, since the effects of amplitude distortion, impulse noise, and inter-symbol interference, caused by delay distortion and/or bandwidth restriction, tend to be averaged out over the group.

FIGURE 21 illustrates an embodiment of the invention utilizing a digital computer to accomplish demodulation and de-multiplexing of several channels of data of the form illustrated in FIGURE 20. A synchronizer is provided similar to that illustrated in FIGURE 17 which utilizes Channel D of the signal series illustrated in FIGURE 20 to generate a family of timing waveforms synchronized with the composite signal at the input. A gated integartor measures the average value of the composite signal over each interval $t/2$. This value is digitized by the analog-to-digital converter (ADC) shown and a number is sent to the computer for each and every interval $t/2$. Assume that this value is unity for each Channel A, B, C and D. The computer then receives the decimal sequence 4, 2, 0, 2, 0, −2, 2 and 0, or its digital equivalent within the interval $4t$.

The reference value $D=(+8)$ is obtained by summing over 8 intervals with $++++++++$ weighting, Channel C $(+8)$ similarly with $++++----$ weighting, Channel B $(4, -4)$ with $++--$; $++--$ weighting, and Channel A $(2, -2, 2, 2)$ with $+-$, $+-$, $+-$, $+-$ weighting, etc. Channel amplitude data is decoded by summing the magnitudes of each decoded sequence element thus channel $|D|=8$, $|C|=8$, $|B|=4+4=8$, and $|A|=2+2+2+2=8$. If the envelope value of Channel B was 2 instead of 1, the computer input would be 5, 3, −1, 1, −1, −3, 3, 1 and $D=8$, $|D|=8$; $C=8$, $|C|=8$; $B=8, -8$, $|B|=16$ and $A=2, -2, 2, 2$, $|A|=8$. Therefore the magnitude of B is seen to have doubled without affecting either the B phase reversal data, which is contained in the sign of the numbers, or the amplitude (or phase) of the other channels. This is characteristic of the orthogonal signal series previously discussed. Since the reference value is derivable, it can be used by the computer to set scale factors and to compensate for gain or signal level variations in the transmission or recording medium. A demodulator utilizing a computer can adapt itself to the medium by such means and can also compensate for non-linear amplitude and delay distortion by programmed correction factors dependent on the value of each sample and its immediate predecessors. Thus each output number could be corrected by the computer prior to decoding.

The amplitude reference value can, if desirable to reduce computer loading, be derived separately using a pair of gated integrators alternately as also shown in FIGURE 21. One integrator is charging while the other holds its value thus providing a continuous reference source for the ADC. Electronic switching can of course be used to accomplish the illustrated DPDT function. One integrator's output is inverted to provide a reference of constant polarity for convenience.

The computer/demodulator can be employed with other waveform series than illustrated in FIGURE 20 as long as the correct number of properly controlled gated integrators are employed. The arrangement of FIGURES 20 and 21 requires only a single integrator and even this could be omitted by sampling the doublet pulse peak values, at the center of the $t/2$ intervals, measuring directly with the ADC.

FIGURE 22 is a block diagram of another type of demodulator which can be used with several types of signal series including those shown in FIGURE 20. This arrangement will demodulate 3 channels and a reference channel such as is shown in FIGURE 20(*a*), (*b*), (*c*) and (*d*). Basically, the product devices shown in FIGURE 22 are driven from either synchronized rates or logic operations among these rates to provide a unipolar output from each gated integrator whose reference input matches the incoming signal series. For Channel B, 4 binary sequences are possible within the interval $4t$, they are: 1, 1; 0, 0; 1, 0; and 0, 1 and for Channel C only two 1, 0. The maximum likelihood detector (MLD) is a comparator which decides which of several inputs is larger and controls a switch connecting that output to the ADC. The MLD thus decides which sequence was transmitted in toto rather than one bit at a time. This is possible because all two bit sequences are orthogonal. For Channel A only 3 bits (within $4t$) of information can be transmitted orthogonally rather than the 4 shown. Suitable sequences are 1111, 1100, 1010, 1001, and their inverses. Use of this technique and MLD detection requires that 4 doublet pulses be generated for Channel A for each 3 bits of information sent. Channel B data outputs are then 2 bits for phase reversal and a number of bits depending on the number of amplitude levels, i.e., 2 levels 1 bit, 4 levels, 2 bits, etc.

Channel C is demodulated similarly and Channel D is used to provide a reference for the ADC as before.

Channel A, since it represents 8 binary sequences, hence requires 8 balanced modulators, 8 gated integrators and an 8 input MLD, is shown as a block. Its reference inputs are $r$; $r \oplus r/2$; $r \oplus r/4$; $r \oplus r'/4$ and their inverses respectively.

A single channel demodulator of this form, except for the amplitude modulation, has been described by A. J. Viterbi in IRE Transactions on Space Electronics and Telemetry, March 1961, vol. SET–7, No. 1, p. 3, entitled "On Coded Phase-Coherent Communications."

I claim:

1. A method of multiplex representation of sampled data comprising:

generating a first series of doublet pulses representing a first series of data samples, each doublet pulse being of predetermined time duration and having a positive part and a negative patr which are of approximately equal time duration, the algebraic sum of the area of said positive part and the area of said negative part being approximately zero;

generating a second series of doublet pulses representing a second series of data samples, each doublet pulse having a time duration twice as great as each doublet pulse in said first series, each doublet pulse in said second series having a positive part and a negative part which are of approximately equal time duration, the algebraic sum of the area of said positive part and the area of said negative part being approximately zero, the positive part of each doublet pulse of said second series being approximately symmetrical about a vertical axis at its mid-point of time duration, the negative part of each doublet pulse of said second series also being approximately symmetrical about a vertical axis at the mid-point of its time duration;

at least one of said series including pulses of unlike polarity; and concurrently applying said first and second pulse series to a receiving medium in time-synchronized relationship.

2. The method as claimed in claim 1 in which:

the composite signal is recovered from said medium in opposite polarities during time periods corresponding to the respective halves of each doublet pulse of said first series so as to obtain a detected form thereof; and recovering the composite signal from said medium in opposite polarities for each two successive pulse periods of said first series so as to obtain a detected form of each doublet pulse of said second series.

3. The method as claimed in claim 1 in which:

a third doublet pulse series representing a third series of information samples is also generated, each doublet pulse in said third series having a time duration four times as great as each doublet pulse in said first series, each doublet pulse in said third series having a positive part and a negative part which are of approximately equal area and of equal time duration, each one-quarter of the time duration of each pulse of said third series being approximately symmetrical with respect to the mid-point of its own time duration, said third pulse series being applied to said medium in time-synchronized relationship with said first and second pulse series.

4. A method of multiplex representation of sampled data comprising:

generating a first series of doublet pulses representing a first series of data samples, each doublet pulse being of predetermined time duration and having first and second halves one of which is positive and one negative and whose areas are approximately equal;

generating a second series of doublet pulses representing a second series of data samples, each doublet pulse in said second series having twice the time duration of the pulses of said first series and having first and second halves one of which is positive and one negative and whose areas are approximately equal, each half pulse being approximately symmetrical about a vertical axis at its mid-point of time duration;

concurrently applying said first and second pulse series to a receiving medium in time-synchronized relationship;

recovering the composite signal from said medium in one polarity during time periods corresponding to the first halves of said doublet pulses of said first series and in the other polarity during time periods corresponding to the second halves of said doublet of said first series, so as to obtain a detected form of each doublet pulse of said first series whose polarity corresponds to that of the associated data sample; and recovering the composite signal from said medium in opposite polarities for each two successive pulse periods of said first pulse series so as to obtain a detected form of each doublet pulse of said second series whose polarity corresponds to that of the associated data sample.

5. The method as claimed in claim 4 in which:

a third doublet pulse series representing a third series of data samples is also generated, each doublet pulse in said third series having a time duration four times as great as each doublet pulse in said first series, each doublet pulse in said third series having a positive part and a negative part which are of approximately equal area and of equal time duration, each one-quarter of the time duration of each pulse of said third series being of approxiamtely equal area and approximately symmetrical with respect to the mid-point of its own time duration, said third pulse series being applied to said medium in time-synchronized relationship with said first and second pulse series.

6. A method of multiplex representation of sampled data comprising:

generating first and second series of doublet pulses representing first and second series of data samples, respectively, each doublet pulse in each of said series being of predetermined time duration and having a positive part and a negative part which when measured relative to a reference axis at which they are of approximately equal time durations also have approximately equal areas, at least one of said doublet pulse series including doublet pulses of unlike polarity, the doublet pulses of said second series having twice the time duration of the doublet pulses of said first series;

concurrently applying said first and second doublet pulses series to a receiving medium in a time synchronized relationship; and detecting the composite signal from said medium in different polarities during time periods corresponding to the positive and negative parts, respectively, of the doublet pulses of a selected series, so as to recover information corresponding to the data samples of the selected series.

7. A method of multiplex representation of sampled data comprising:

generating first, second and third series of doublet pulses representing first, second and third series of data samples, respectively, each doublet pulse in each of said series being of predetermined time duration and having a positive part and a negative part which when measured relative to a reference axis at which they are of approximately equal time durations also have approximately equal areas, at least one of said doublet pulse series including doublet pulses of unlike polarity, the doublet pulses of said second series having twice the time duration of the doublet pulses of said first series and the doublet pulses of said third series having twice the time duration of the doublet pulses of said second series;

concurrently applying said first, second and third doublet pulse series to a receiving medium in time-synchronized relationship; and detecting the composite signal from said medium in different polarities during time periods corresponding to the positive and negative parts, respectively, of the doublet pulses of a selected series, so as to recover information corresponding to the data samples, of the selected series.

8. A method of multiplex representation of sampled data comprising:

generating a plurality of pulse series whose frequencies are interrelated in accordance with a geometric series, at least one of said pulse series including doublet pulses of unlike polarity, each of said doublet pulses having a positive part and a negative part which when measured relative to a reference axis at which they are of approximately equal time durations also have approximately equal areas;

concurrently applying all of said pulse series to a receiving medium in time-synchronized relationship; and detecting the composite signal from said medium so as to recover the multiplexed data in each of said pulse series independently of the others.

9. The method as claimed in claim 8 in which:

one of said pulse series is a synchronizing signal.

10. A method of multiplex data representation comprising:

generating a plurality of bipolar pulse series, each representing a respectively corresponding series of data samples, at least one of said bipolar pulse series including bipolar pulses of inverted polarity, the duration of each bipolar pulse of each of said series being equal to $2^{(n-1)}t$, where $n$ is an integer representing the particular bipolar pulse series and where $t$ is the duration of the bipolar pulses of the first bipolar pulse series;

concurrently applying said plurality of bipolar pulse series to a signal medium in synchronized relationship such that in the composite signal received from the signal medium the commencement of each bipolar pulse of the second and each succeeding bipolar pulse series substantially coincides with the commencement of a bipolar pulse of said first bipolar pulse series;

producing a plurality of control signals each of which has a periodicity corresponding to a respective one of said bipolar pulse series and is synchronized with the corresponding portion of said composite received signal; and synchronously detecting the composite received signal under control of each of said control signals separately from the other control signals, to produce a a corresponding signal output series representing the corresponding series of data samples;

the average during each of the time periods of each of said control signals of the instantaneous product of itself and the instantaneous sum of all of the non-corresponding bipolar pulse series being substantially equal to zero, whereby the synchronous detection of the composite received signal under control of each of said control signals produces detection of the corresponding bipolar pulse series substantially unaffected by any of the non-corresponding bipolar pulse series.

11. The method of claim 10, wherein:

the bipolar pulses of at least one bipolar pulse series are both amplitude modulated and phase modulated, the amplitude modulation being accomplished by modulating both the negative and positive portions of a single bipolar pulse in accordance with a single data sample, the phase modulation being accomplished by the selective inversion of bipolar pulses; and wherein the bipolar pulses of at least one other bipolar pulse series are made of fixed amplitude so as to provide an amplitude reference signal for the demodulation of said at least one series of bipolar pulses.

12. The method claimed in claim 10, wherein:

at least one of said bipolar pulse series is amplitude modulated to represent a corresponding series of data samples, the amplitudes of both the positive and negative portions of each bipolar pulse being proportional to the amplitude of the particular data sample represented thereby.

13. The method claimed in claim 10, wherein:

at least one of said bipolar pulse series is both amplitude modulated and phase modulated, the amplitude modulation being achieved by modulating the amplitude of both the positive and negative portions of each bipolar pulse, and the phase modulation being achieved by the inversion of selected bipolar pulses.

14. A multiplexing method of developing an information bearing signal comprising:

the steps of generating a plurality of phase-synchronous series of bipolar pulses, at least one of said series being repetitive with a period which is an even multiple of the period of another of said plurality, selectively reversing the polarity of the bipolar pulses of at least one of said series to develop a sequence in accordance with information to be carried by said one series, and recovering the selected series by applying a reference signal having an alternating waveform of the same period as the selected series and integrating over the period of one or more complete bipolar pulses of the selected series to derive the information present thereon without developing interference from other series of bipolar pulses which may be present, the bipolar pulses of each series having repetitive periods greater than the series of pulses having the shortest period being symmetrical about the midpoints of the periods of those bipolar pulses of each series of pulses having shorter periods.

15. The method of claim 14 further including:

the step of modulating additional information on a selected series by adjusting the amplitude of selected bipolar pulses in said series in accordance with information to be represented by said amplitude.

16. The method of claim 14 wherein:
the periods of the respective series of bipolar pulses are chosen from a geometric progression of ratio 1/2.

17. The method of claim 14 wherein:
the reference signal which is applied to demodulate a selected series is a rectangular waveform which is phase synchronized to the bipolar pulses of the series to be demodulated.

18. The method of claim 14 wherein:
the step of integrating the result of the combination of said reference signal with the selected series further includes the step of restoring the integrator to predetermined levels at the end of one or more bipolar pulses of the series being recovered.

19. The method of claim 14 further including:
the step of synchronizing said reference signal with the series to be recovered by means of a synchronizing signal derived from one or more of said series.

20. The method of claim 14 further including:
the step of modulating additional information on respective series by adjusting together the amplitude of a number of bipolar pulses in each series equal in duration to one or more half periods of the bipolar pulses of the series of longest periods, in accordance with information to be represented by said amplitude.

21. The method of claim 20 wherein:
the polarity sequences of bipolar pulses of number exceeding two whose amplitudes are adjusted together are constrained to represent only binary information sequences comprising an orthogonal set.

22. A multiplexing system for injecting information on a carrier medium in channels of distinct periodicity and for detecting the information on a selected one of said channels without interference from the remainder of the channels comprising:
means for generating a plurality of series of phase-synchronized bipolar pulses, means for selectively fixing the polarity of bipolar pulses in accordance with the information to be modulated thereon, the periods of each series of bipolar pulses being related to the periods of other series of pulses as terms in a geometric progression of ratio 1/2, and a synchronous demodulator arranged to detect the information on a selected series without interference from other series which may be present with the selected series.

23. A system in accordance with claim 22 wherein:
the demodulator comprises means for applying a reference signal having an alternating waveform which is phase synchronized with and of the same periodicity as the selected series to be detected, and further includes an integrator for integrating the result of the combination of the reference signal with the selected series to develop an output indicative of the information modulated on said selected series.

24. A system in accordance with claim 23 further including:
means for restoring the integrator to predetermined levels at the end of one or more periods of the selected series.

25. The system in accordance with claim 23 further including:
means for adjusting the amplitude of selected bipolar pulses in a given series in accordance with information to be modulated thereon.

26. Apparatus for recovering information from a composite signal comprised of discrete phase-synchronous series of bipolar pulses which may be polarity and/or amplitude modulated, which series have periods related to each other as the terms of a geometric progression of ratio 1/2, said apparatus comprising:
a demodulator for applying a reference signal having an alternating waveform of the same periodicity as a selected series in the composite signal, and an integrator coupled to the demodulator output for integrating over the period of one or more complete bipolar pulses of the selected series to derive the information present thereon without developing interference from other series of bipolar pulses which may comprise the composite signal.

27. The apparatus of claim 26 further including:
a synchronous switch coupled to the integrator for restoring the integrator to a predetermined level at the end of one or more periods of the selected series.

28. The apparatus of claim 26 further including:
a detector coupled to the integrator output for detecting the information represented by the amplitude of the integrator output at the end of one or more periods of the selected series.

29. The apparatus of claim 26 further including:
means coupled to an integrator output for deriving amplitude information from one or more of said series to provide one or more amplitude references.

References Cited

UNITED STATES PATENTS

| | | | |
|---|---|---|---|
| 3,037,190 | 5/1962 | Herbst | 340—170 |
| 3,119,964 | 1/1964 | Crafts | 325—30 |

ROBERT L. GRIFFIN, *Primary Examiner.*

WILLIAM S. FROMMER, *Assistant Examiner.*

U.S. Cl. X.R.

178—66; 179—15; 325—30